(12) United States Patent
Fanson et al.

(10) Patent No.: US 7,468,171 B2
(45) Date of Patent: Dec. 23, 2008

(54) PROCESS USING MICROWAVE ENERGY AND A CATALYST TO DECOMPOSE NITROGEN OXIDES

(75) Inventors: Paul T Fanson, Brighton, MI (US); Hirohito Hirata, Shizouka (JP); Masaya Ibe, Shizouka (JP); Steven L Suib, Storrs, CT (US); Vinit Makwana, Berlin (DE)

(73) Assignees: Toyota Motor Corporation, Toyota (JP); Toyota Motor Engineering & Manufacturing North America, Inc., Erlanger, KY (US); The University of Connecticut, Farmington, CT (US)

( * ) Notice: Subject to any disclaimer, the term of this patent is extended or adjusted under 35 U.S.C. 154(b) by 381 days.

(21) Appl. No.: 11/342,777

(22) Filed: Jan. 30, 2006

(65) Prior Publication Data

US 2007/0297962 A1    Dec. 27, 2007

Related U.S. Application Data

(60) Provisional application No. 60/648,616, filed on Jan. 31, 2005.

(51) Int. Cl.
*B01D 53/56* (2006.01)
*B01D 53/94* (2006.01)
*F01N 3/10* (2006.01)
*F01N 3/18* (2006.01)

(52) U.S. Cl. ............ 423/213.2; 423/213.5; 423/239.1; 204/157.3; 60/295; 60/299; 60/300

(58) Field of Classification Search ............. 423/213.2, 423/213.5, 239.1; 204/157.3; 60/295, 299, 60/300
See application file for complete search history.

(56) References Cited

U.S. PATENT DOCUMENTS

| | | | | |
|---|---|---|---|---|
| 3,983,021 A | * | 9/1976 | Henis | 204/164 |
| 4,076,606 A | * | 2/1978 | Suzuki et al. | 204/157.3 |
| 5,213,780 A | * | 5/1993 | Helfritch | 423/239.1 |
| 5,767,470 A | * | 6/1998 | Cha | 204/157.3 |
| 5,782,085 A | * | 7/1998 | Steinwandel et al. | 60/274 |
| 6,190,507 B1 | * | 2/2001 | Whealton et al. | 204/157.3 |
| 6,267,940 B1 | * | 7/2001 | Chang et al. | 423/239.1 |
| 6,334,986 B2 | * | 1/2002 | Gieshoff et al. | 423/239.1 |
| 6,468,489 B1 | * | 10/2002 | Chang et al. | 423/239.1 |
| 2001/0002244 A1 | * | 5/2001 | Gieshoff et al. | 423/235 |
| 2001/0038813 A1 | * | 11/2001 | Gieshoff et al. | 423/239.1 |

FOREIGN PATENT DOCUMENTS

JP     5-76727 A  *  3/1993

* cited by examiner

*Primary Examiner*—Timothy C Vanoy
(74) *Attorney, Agent, or Firm*—Gifford, Krass, Sprinkle, Anderson & Citkowski, P.C.

(57) ABSTRACT

A process for decomposing nitrogen oxides includes the following steps: providing a catalyst, passing a gaseous nitrogen oxide over the catalyst and exposing the catalyst to microwave energy. The gaseous nitrogen oxide is broken down into nitrogen and oxygen molecules.

13 Claims, 3 Drawing Sheets

PROCESS USING MICROWAVE ENERGY AND A CATALYST TO DECOMPOSE NITROGEN OXIDES

RELATED APPLICATION

This application claims priority of U.S. Provisional Patent Application Ser. No. 60/648,616 filed Jan. 31, 2005, which is incorporated herein by reference.

FIELD OF THE INVENTION

The invention relates to a process for decomposing nitrogen oxides and more particularly to a process for decomposing nitrogen oxides using microwave energy.

BACKGROUND OF THE INVENTION

Exhaust from combustion engines create nitrogen oxides ($NO_x$) that contribute to smog and other forms of environmental pollution. $NO_x$ must be removed from the exhaust streams of these engines in order to protect the environment and satisfy government regulations. Current 3-way catalyst converter technology is used to purify the $NO_x$ in automotive exhaust under certain limiting conditions. For example, 3-way catalysts operate at high temperatures greater than 300° C. In addition, in order to meet current emissions standards, 3-way catalysts contain a large quantity of precious metals such as platinum, rhodium, and palladium. Finally, 3-way catalysts only operate properly if the air-to-fuel ratio is stoichiometric.

Several ideas have been proposed to remove $NO_x$ from automotive exhaust without using a 3-way catalyst, and to reduce the overall precious metal loading of the catalyst. For stationary combustion sources, such as power plants, waste incinerators, and gas turbines, the most commonly used strategy for $NO_x$ purification is selective catalytic reduction (SCR) typically using ammonia ($NH_3$) as a reducing agent over a vanadia/titania catalyst. A similar strategy has been proposed for mobile combustion sources, such as automobiles in which urea is stored on-board and is used as a reducing agent to purify $NO_x$. However, the use of urea on vehicles has limitations, such as the safety of such compounds on a vehicle, as well as a lack of infrastructure for urea distribution.

Other catalysts have also been suggested to replace or enhance the activity of current 3-way catalysts. It has been proposed to use copper-zeolite catalysts (specifically Cu/ZSM-5), however this system was shown to have low activity and durability under exhaust conditions. Additionally, nitrogen storage and reduction (NSR) catalysts may be used to purify $NO_x$. This catalyst combines a 3-way catalyst with an alkaline-based $NO_x$ trap. However, this system is very sensitive to sulfur poisoning and the air-fuel ratio must be very tightly controlled.

There is therefore a need in the art for an improved process for the decomposition of $NO_x$ in an automotive application.

SUMMARY OF THE INVENTION

A process for decomposing nitrogen oxides includes the following steps: providing a catalyst, passing gaseous nitrogen oxide over the catalyst and exposing the catalyst to microwave energy. The gaseous nitrogen oxide is broken down into nitrogen and oxygen molecules.

DETAILED DESCRIPTION OF THE PREFERRED EMBODIMENTS

Figure 1:
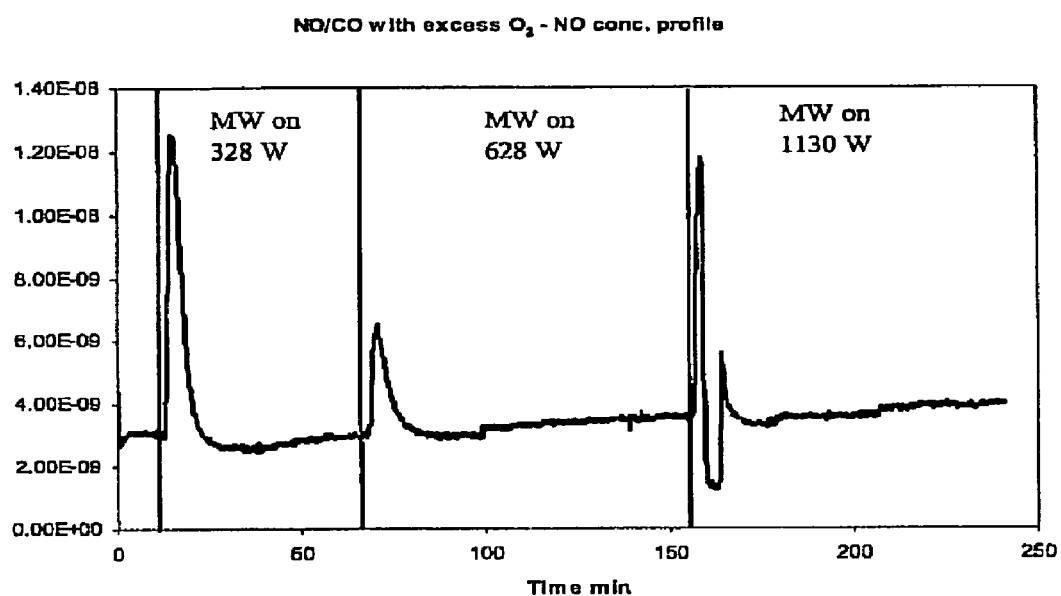
FIG. 1 is a figure of the relative partial pressure of nitrogen oxide plotted against time for different microwave power levels.

There is described a process for decomposing nitrogen oxides. The process includes providing a catalyst and then passing gaseous nitrogen oxide over the catalyst. The catalyst is then exposed to microwave energy. The gaseous nitrogen oxide is broken down into nitrogen and oxygen molecules.

For the purposes of describing the process of the present invention a 3-way catalyst having a precious metal dispersed in a metal oxide support material will be discussed. The precious metal may be an element such as Platinum, Palladium, Rhodium, Silver and Gold. The metal oxide support material may be a composition or compound such as Aluminum Oxide, Cesium Oxide, Titanium Oxide, Zirconium Oxide and Silicon Oxide. The 3-way catalyst may also include a base metal such as Iron, Copper, Nickel, and Manganese. While the description focuses on a 3-way catalyst and activated carbon for the purposes of describing the process of the present invention, it is to be realized that the process of the present invention may also be utilized on other catalysts including: a nitrogen storage catalyst having a precious metal and an alkaline metal, such as Sodium, Magnesium, Potassium, Calcium, Rubidium, Strontium, Cesium, and Barium dispersed in a metal oxide support material.

The process of the present invention also includes the step of exposing the catalyst to microwave energy. The microwave energy may have a power of from 0.001 to 5000 Watts. Additionally, the microwave energy may have a frequency of from 2.0 to 4.0 Gigahertz. Microwave (MW) heating is fundamentally different from conventional heating. As opposed to the generation of heat by external sources as in conventional heating, the generation of heat in microwaves is produced by the interaction between molecules in the heated material and the electromagnetic field created in the MW oven. With microwaves, energy can be delivered to reacting molecules at a much greater rate if compared to conventional heating, which makes a more efficient way to heat, since microwaves allow faster and more uniform heating.

EXAMPLES

The catalyst described is a 0.5 wt % Platinum reduction-oxidation component dispersed in an Aluminum Oxide support material with a 26% dispersion and a 125 micrometer particle size. About 500 mg of the catalyst was packed between quartz wool plugs in a quartz tubular reactor.

The experiments were performed using an ASTEX model GL139 microwave reactor. The power output of the oven was regulated using a Micristar controller. Microwaves were generated at 2.45 GHz with a maximum variable power supply of 1.3 kW. Nitrogen Oxide experiments were carried out at atmospheric pressure in a continuous flow fixed-bed tubular quartz reactor with Teflon fittings. The reactants Nitrogen oxide and Carbon Monoxide in excess of oxygen were reacted over the catalyst. The reaction mixture of 400 ppm Nitrogen Oxide, 6500 ppm Carbon Monoxide and 5% Oxygen in Helium was supplied to the reactor at a flow rate of 25 ml/minute. The nitrogen oxide and reactant compounds were monitored using an on-line quadrupole mass spectrometer. The gas inlet to the reactor was modified with a three-way valve to allow for introduction of the reaction gases and a regenerating gas at different intervals.

Experiments carried out using the above referenced reactants at various power levels are depicted in FIG. 1. As can be seen in the Figure, the decomposition of the nitrogen oxide can be observed at a power level of 1130 Watts. The dip of the partial pressure following an initial spike when the power is turned on indicates decomposition of the nitrogen oxide. The decomposition lasts for approximately 10 minutes at which point the catalyst appears to become deactivated, resulting in no further decomposition of the nitrogen oxide. The conversion of nitrogen oxide in the ten-minute window is approximately 80%.

Figure 2:
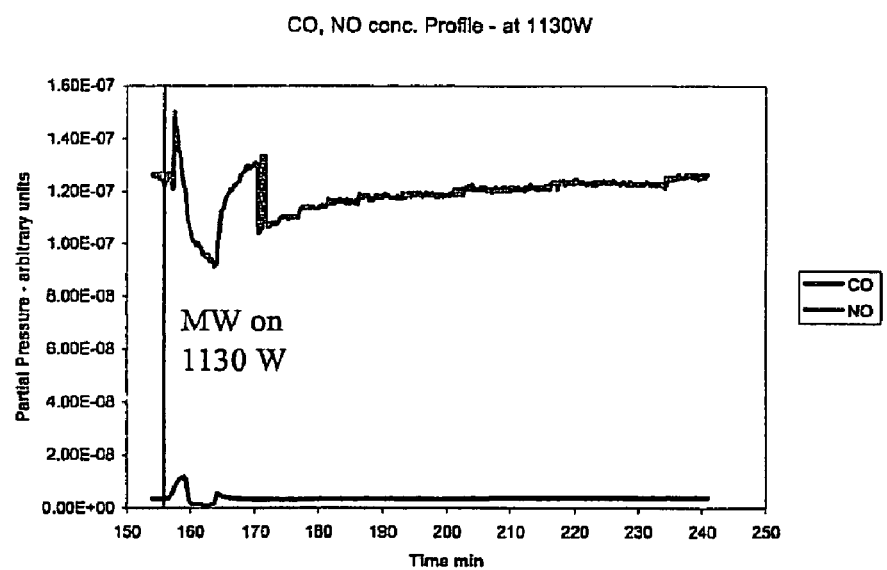
FIG. 2 is a figure of the relative partial pressure of nitrogen oxide and carbon monoxide plotted against time for a 1130 Watt power level.
Figure 4:
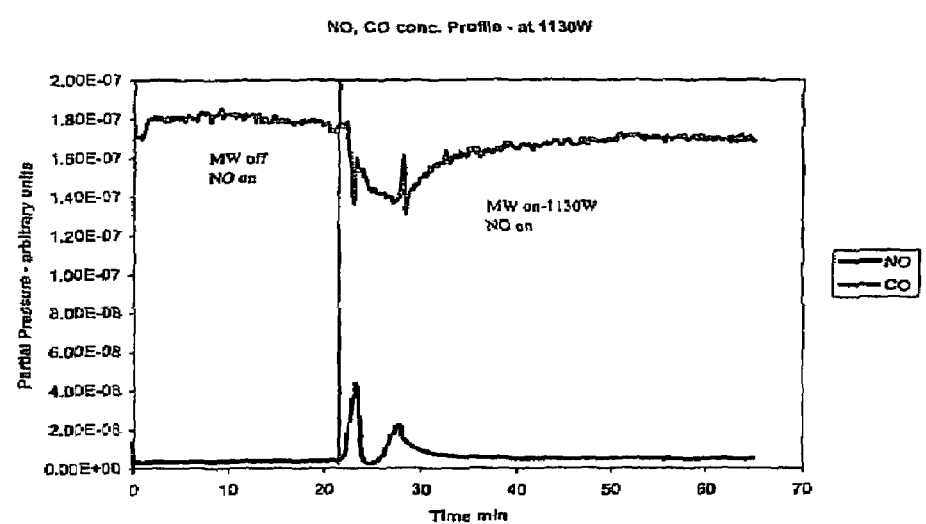
FIG. 4 is a figure of the relative partial pressure of nitrogen oxide and carbon monoxide plotted against time for a 1130 Watt power level.

FIG. 2 is a plot of the partial pressure of nitrogen oxide and carbon monoxide at a power level of 1130 Watts. The plot confirms the decomposition of nitrogen oxide and the simultaneous conversion of carbon monoxide into carbon dioxide. This result is confirmed in a different run plotted in FIG. 4.

Figure 3:
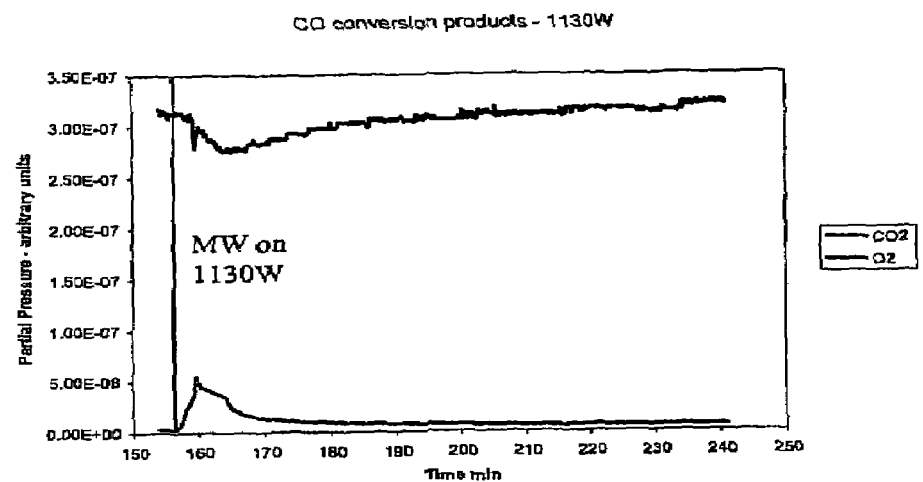
FIG. 3 is a figure of the relative partial pressure of carbon dioxide and oxygen plotted against time for a 1130 Watt power level.

FIG. 3 is a plot of the Oxygen and Carbon dioxide partial pressures at 1130 Watts. The drop of the oxygen level is consistent with the conversion of the nitrogen oxides into nitrogen dioxides.

Figure 5:
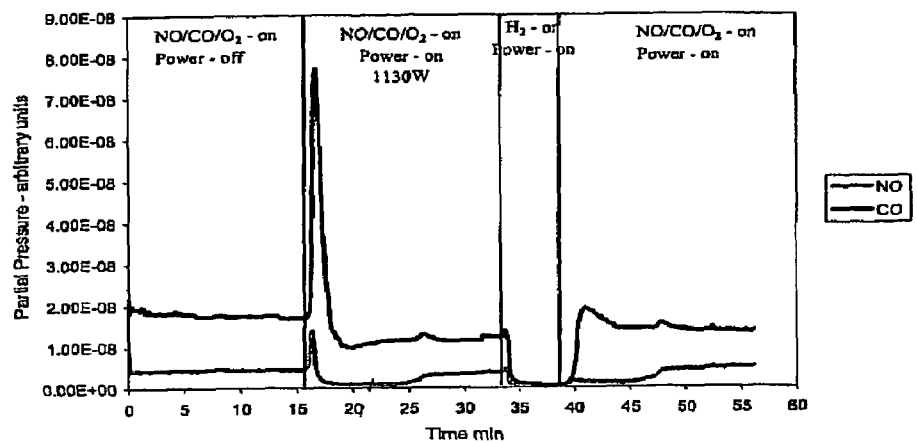
FIG. 5 is a figure of the relative partial pressure of nitrogen oxide and carbon monoxide plotted against time with a hydrogen regeneration cycle for a 1130 Watt power level.
Figure 6:
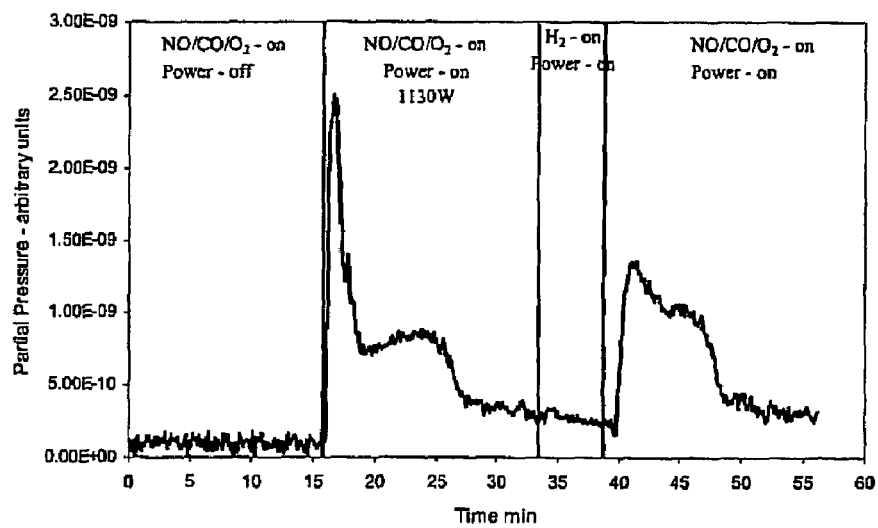
FIG. 6 is a figure of the relative partial pressure of nitrogen dioxide against time with a hydrogen regeneration cycle for a 1130 Watt power level.

FIGS. 5 and 6 are plots of the same reaction at 1130 Watts with the introduction of a regenerating gas after the catalyst has become deactivated. The plot of FIG. 5 shows the same result as that indicated in FIGS. 1 and 4, a dip of the line indicating a decomposition of the nitrogen oxide at approximately 80% for ten minutes. Next hydrogen is fed over the catalyst under power for approximately 5 minutes. The nitrogen oxide feed is then resumed and the same dip is achieved indicating nitrogen oxide conversion after the regeneration of the catalyst.

The plot of the formation of nitrogen oxide shown in FIG. 6 is consistent with the plot of FIG. 5. The spike of nitrogen dioxide occurs in the same time period as the decomposition of the nitrogen oxide, indicating a conversion of the nitrogen oxide to nitrogen dioxide.

While the above examples provide a description of the process of the present invention, they should not be read as limiting the process of the present invention. Specifically, various power levels and catalysts may be utilized by the present invention in an effort to improve the decomposition of nitrogen oxide. Additionally, the nitrogen oxide may include combustion exhaust gases such as nitrogen, water, carbon monoxide, carbon dioxide, oxygen, nitrogen oxide, nitrogen dioxide, hydrogen and hydrocarbons.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A process for decomposing nitrogen oxides comprising the steps of:
    a) providing a catalyst;
    b) passing a gaseous nitrogen oxide over the catalyst;
    c) exposing the catalyst to microwave energy;
wherein the gaseous nitrogen oxide is broken down into nitrogen and oxygen molecules and wherein the nitrogen and oxygen molecules react to form nitrogen dioxide.

2. The process of claim 1 wherein the gaseous nitrogen oxide is contained in combustion exhaust gases.

3. The process of claim 2 wherein the combustion exhaust gases include components selected from the group consisting of: nitrogen, water, carbon monoxide, carbon dioxide, oxygen, nitrogen oxide, nitrogen dioxide, hydrogen and hydrocarbons.

4. The process of claim 1 wherein the microwave energy has a power of from 0.001 to 5000 Watts.

5. The process of claim 1 wherein the microwave energy has a frequency of from 2.0 to 4.0 Gigahertz.

6. The process of claim 1 wherein the catalyst includes a precious metal dispersed in a metal oxide support material.

7. The process of claim 6 wherein the precious metal is selected from the group consisting of: Platinum, Palladium, Rhodium, Silver and Gold.

8. The process of claim 7 wherein the metal oxide support material is selected from the group consisting of: Aluminum Oxide, Cesium Oxide, Titanium Oxide, Zirconium Oxide and Silicon Oxide.

9. The process of claim 1 further including the step of exposing the catalyst to hydrogen gas thereby regenerating the catalyst.

10. A process for decomposing nitrogen oxides in an automotive exhaust at atmospheric pressure comprising the steps of:
    a) providing a catalyst containing substrate in an exhaust system of a vehicle;
    b) passing a gaseous nitrogen oxide over the catalyst containing substrate;
    c) exposing the catalyst containing substrate to microwave energy;
wherein the gaseous nitrogen oxide is broken down into nitrogen and oxygen molecules and wherein the nitrogen and oxygen molecules react to form nitrogen dioxide.

11. The process of claim 10 wherein the gaseous nitrogen oxide is contained in a combustion exhaust gas.

12. The process of claim 11 wherein the combustion exhaust gas includes components selected from the group consisting of: nitrogen, water, carbon monoxide, carbon dioxide, oxygen, nitrogen oxide, nitrogen dioxide, hydrogen and hydrocarbons.

13. A process for decomposing nitrogen oxides comprising the steps of:
    a) providing a catalyst;
    b) passing a gaseous nitrogen oxide over the catalyst;
    c) exposing the catalyst to microwave energy;
wherein the gaseous nitrogen oxide is broken down into nitrogen and oxygen molecules;
    d) and exposing the catalyst to hydrogen gas thereby regenerating the catalyst.

* * * * *